(No Model.)
J. S. HUNTER.
CAR COUPLING.
No. 481,567.  Patented Aug. 30, 1892.
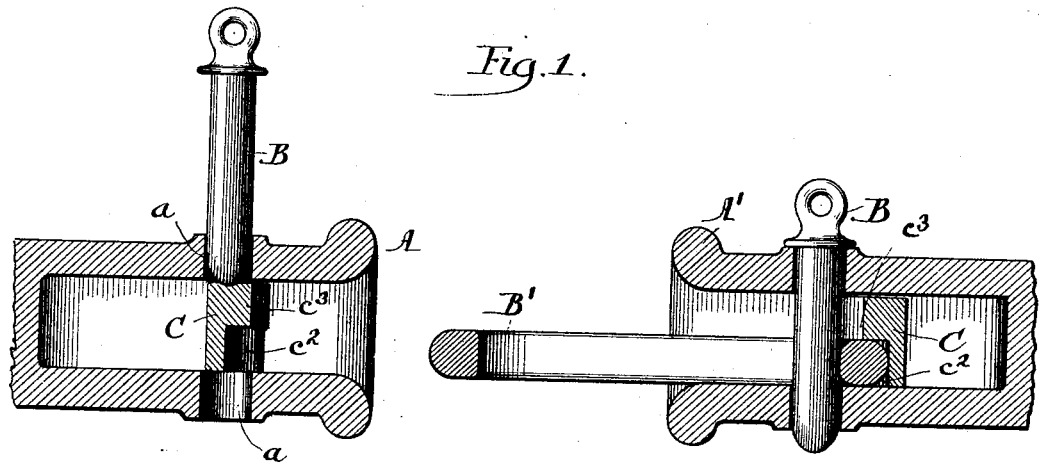
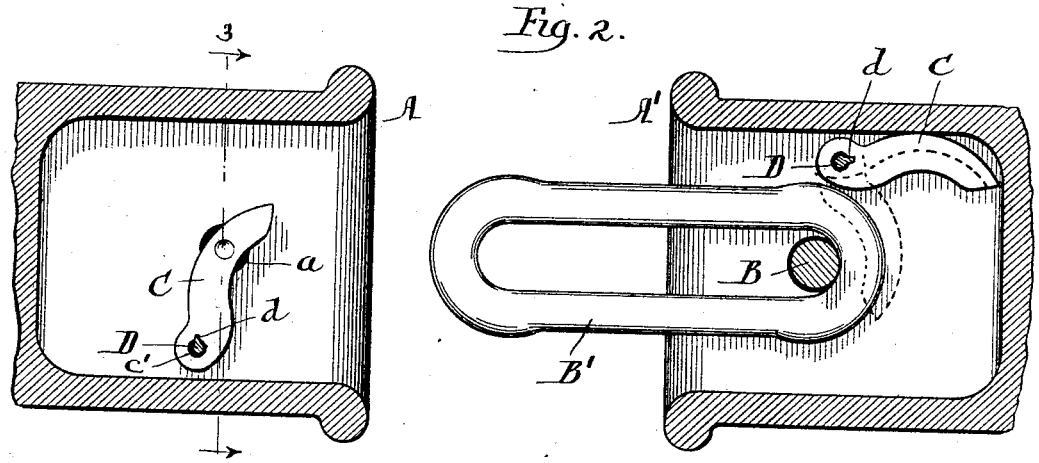
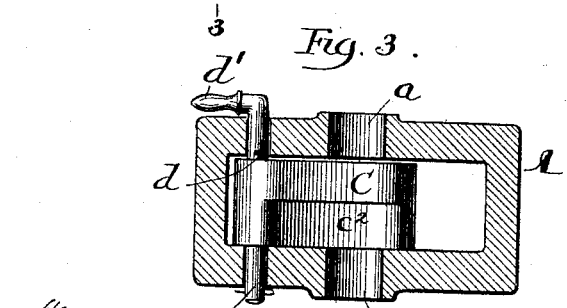
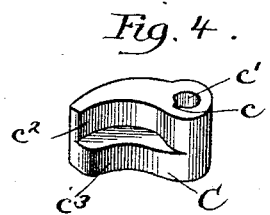
Witnesses:
Fred Gerlach
J. B. Carpenter
Inventor:
Jacob S. Hunter
By Peirce & Fisher
Attorneys.
THE NORRIS PETERS CO., PHOTO-LITHO., WASHINGTON, D. C.

United States Patent Office.

JACOB S. HUNTER, OF NICKERSON, KANSAS.

CAR-COUPLING.

SPECIFICATION forming part of Letters Patent No. 481,567, dated August 30, 1892.

Application filed February 26, 1892. Serial No. 422,890. (No model.)

*To all whom it may concern:*

Be it known that I, JACOB S. HUNTER, residing at Nickerson, in the county of Reno, State of Kansas, have invented certain new and useful Improvements in Car-Couplers, of which I do declare the following to be a full, clear, and exact description, reference being had to the accompanying drawings, forming part of this specification.

My present invention has relation to that class of car-couplers wherein provision is made for holding the coupling-pin in elevated position by means of a gate adapted to be forced from beneath the pin by the entrance of the coupling-link into the draw-head, so as to permit the pin to fall into the eye of the link.

My invention consists in the novel construction of gate, hereinafter described, illustrated in the accompanying drawings, and particularly defined in the claim at the end of this specification.

Figure 1 is a view in vertical section through adjacent draw-heads. Fig 2 is a view in horizontal section through the draw-head shown in Fig. 1, the section being taken immediately above the gates and one of the gates being shown as swung in backward position. Fig. 3 is a view in vertical section on line 3 3 of Fig. 2. Fig. 4 is a detail perspective view of one of my improved gates, the gate being shown in inverted position.

A and A' denote the two draw-heads of the adjacent cars to be coupled, these draw-heads being of any usual or suitable construction. Each of these draw-heads is provided with the usual openings $a$ for the coupling-pin B. At one side of the opening for the coupling-pin is sustained my improved gate C. This gate is pivoted at one side of the draw-head by means of the shaft D, that is preferably provided with a spline $d$, entering a corresponding groove $c$ at one side of the perforation $c'$ of the gate through which the shaft D passes, and by this means the gate is connected to the shaft, so that it can be readily turned thereby. The upper end of the shaft D is furnished with a handle $d'$, whereby the shaft can be turned in order to shift the gate within the draw-head. The gate C is preferably of the curved shape shown and its face is formed with the recess $c^2$, having an overhanging portion or shoulder $c^3$. The purpose of this recess $c^2$ and shoulder $c^3$ is to permit the gate to somewhat overlap the end of the coupling-link B' in order to hold this link in horizontal position, so that it will accurately enter the mouth of the corresponding draw-head of the next car to be coupled. The gate C when in position for sustaining the coupling-pin B extends beneath the pin-opening in the top of the draw-head, and in such position it will serve to sustain the coupling-pin B, as seen at the left-hand side of Fig. 1 of the drawings. By reference also to the draw-head illustrated at the right-hand side of Fig. 1 of the drawings it will be seen that the gate C has its shoulder $c^3$ overlapping the end of the coupling-link B', thereby serving to sustain this link in horizontal position, so that it shall accurately enter the mouth of the draw-head with which it is to be coupled.

When the parts are in the position illustrated in Fig. 1 it is manifest that if the draw-heads are shunted together in order to couple the cars the coupling-link B' will enter the mouth of the draw-head A and contacting with the gate C, that sustains the coupling-pin B, will force this gate backward, causing it to pass from beneath the pin B and thus permit the pin to drop within the eye of the link B', thereby automatically coupling the draw-heads together. In some cases it is necessary to couple cars having draw-heads which are of unequal heights, and when this is the case the coupling-link B' will be placed within the highest draw-head, the gate C will be moved back to the position shown at the right-hand side of Fig. 2 of the drawings, and the coupling-link will be tipped downward, so as to enable its free end to enter the mouth of the lower draw-head when the cars are shunted together.

It is manifest that by means of the handle $d'$ the shaft D can be readily turned, so as to shift the gate into proper position either for sustaining the coupling-pin, as seen at the right-hand side of Fig. 1, or for moving the gate over the end of the coupling-pin, as shown at the left-hand side of Fig. 1, or for moving the gate entirely out of the way when the coupling-link is to be tipped downward in order to permit draw-heads of unequal height to be coupled together, as above explained.

By locating the gate at one side of the draw-head and by providing the gate with an overhanging shoulder or portion, as shown, it will serve to effectively hold the link in horizontal position and against danger of displacement incident to the jolting of the cars until the draw-heads are coupled together. So, also, by forming the gate of the curved shape shown, as I prefer to do, I am enabled to more effectively hold the coupling-link in horizontal position.

It is manifest that my improved gate can be attached to a great variety of draw-heads such as are now in common use, and by its employment the danger incident to the coupling of cars by the attendant standing between the cars and guiding the coupling-link with his hand is avoided.

Having thus described my invention, what I claim as new and desire to secure by Letters Patent, is—

In a car-coupling, the combination, with the draw-head having an opening to receive the coupling-link and a pin-hole, of a laterally-swinging curved gate C, said gate having formed upon its outer face a curved recess $c^2$ and an overhanging shoulder $c^3$, whereby said gate may partially encircle and overlap the end of the link, a shaft D, extending outside the draw-head, and a handle $d'$ for operating said shaft and swinging gate, substantially as described.

JACOB S. HUNTER.

Witnesses:
JAY D. FOX,
ALBERT NORTH,